United States Patent
Duan et al.

(10) Patent No.: US 12,053,427 B2
(45) Date of Patent: Aug. 6, 2024

(54) VIBRATION CAPSULE AND POWER SUPPLY METHOD THEREOF

(71) Applicants: Ankon Medical Technologies (Shanghai) Co., LTD, Shanghai (CN); ANX IP HOLDING PTE. LTD., Singapore (SG)

(72) Inventors: Xiaodong Duan, Pleasanton, CA (US); Jianming Du, Wuxi (CN)

(73) Assignee: ANKON MEDICAL TECHNOLOGIES (SHANGHAI) CO., LTD., Shanghai (CN)

(*) Notice: Subject to any disclaimer, the term of this patent is extended or adjusted under 35 U.S.C. 154(b) by 537 days.

(21) Appl. No.: 17/336,239

(22) Filed: Jun. 1, 2021

(65) Prior Publication Data
US 2021/0369556 A1 Dec. 2, 2021

(30) Foreign Application Priority Data
Jun. 1, 2020 (CN) .......................... 202010486152.2

(51) Int. Cl.
*A61H 23/02* (2006.01)
*H02J 7/00* (2006.01)

(52) U.S. Cl.
CPC ............ *A61H 23/02* (2013.01); *H02J 7/0063* (2013.01); *H02J 7/007* (2013.01); *A61H 2201/0111* (2013.01); *A61H 2201/5007* (2013.01); *A61H 2205/083* (2013.01); *H02J 2207/20* (2020.01)

(58) Field of Classification Search
CPC .................................................... A61H 23/02

USPC .......................................................... 307/66
See application file for complete search history.

(56) References Cited

U.S. PATENT DOCUMENTS

| 10,888,277 | B1* | 1/2021 | Ben-Tsur | ................ A61H 1/00 |
| 2015/0073315 | A1* | 3/2015 | Shabbat | ................ A61H 23/02 |
| | | | | 601/46 |
| 2015/0313792 | A1* | 11/2015 | Shohat | .................. A61H 21/00 |
| | | | | 601/46 |

FOREIGN PATENT DOCUMENTS

| CN | 105610215 A | 5/2016 |
| CN | 107847392 A | 3/2018 |
| CN | 109586358 A | 4/2019 |

* cited by examiner

*Primary Examiner* — Joseph Chang
(74) *Attorney, Agent, or Firm* — Treasure IP group, LLC

(57) ABSTRACT

The present invention provides a vibration capsule and a power supply method thereof. The vibration capsule includes an enclosure, a vibration source disposed within the enclosure and a battery unit electrically connected to the vibration source. The battery unit includes a battery and a power supply regulation unit connected to the circuit of the battery and the vibration source. The vibration capsule regulates the supply voltage of the battery to the vibration source through the power supply regulation unit, so that the battery provides the supply voltage lower than the total voltage of the battery to the vibration source, which can reduce power consumption and provide longer vibration time while ensuring the vibration safety of the vibration capsule.

14 Claims, 3 Drawing Sheets

VIBRATION CAPSULE AND POWER SUPPLY METHOD THEREOF

CROSS-REFERENCE TO RELATED APPLICATIONS

The application claims priority to Chinese Patent Application No. 202010486152.2 filed on May 1, 2020, the contents of which are incorporated by reference herein.

FIELD OF INVENTION

The present invention relates to a medical device, and more particularly to a vibration capsule and a power supply method thereof.

BACKGROUND

With the development of science and technology, more advanced medical devices have been developed for the diagnosis and treatment of human diseases. The development of technique of ingestible medical devices, represented by vibration capsule and capsule endoscope, has greatly improved the comfort of treatment and avoided the occurrence of cross-infection.

Such ingestible medical capsules are small in size, with limited space inside the capsule to accommodate only a small button cell battery, which has limited discharge capacity and battery capacity. When the battery outputs voltage to the vibration motor through a control circuit, the vibration motor rotates fast and stably, and the capsule vibrates strongly, but with large power consumption, so the button cell battery will run out soon, and consequently fail to meet the need for a long time of working of the vibration capsule.

In view of this, it is necessary to provide an improved vibration capsule and a power supply method thereof to solve the technical problems.

SUMMARY OF THE INVENTION

The present invention provides a vibration capsule and a power supply method thereof.

According to one aspect of the present invention, there is provided a vibration capsule, comprising:
an enclosure;
a vibration source disposed within the enclosure;
a battery unit electrically connected to the vibration source, the battery unit comprising a battery and a power supply regulation unit connected to the circuit of the battery and the vibration source.

Further, the battery comprises:
a first button cell battery connected in series with the vibration source to form a first circuit;
a second button cell battery connected in series to the negative terminal of the first button cell battery, the second button cell battery connected in series with the vibration source to form a second circuit;
the power supply regulation unit comprises:
a switching member electrically connected to the positive terminal of the first button cell battery;
an electronic control member electrically connected to the switching member, comprising a first control terminal and a second control terminal;
a first MOSFET, comprising a control terminal connected to the first control terminal, a current input terminal connected to the positive terminal of the first button cell battery, and a current output terminal connected to the vibration source; and
a second MOSFET, comprising a control terminal connected to the second control terminal, a current input terminal connected to the vibration source, and a current output terminal connected to the negative terminal of the second button cell battery.

Further, the switching member comprises a reed switch and a third MOSFET, where the third MOSFET comprises a control terminal connected to the reed switch, a current input terminal connected to the positive terminal of the first button cell battery, and a current output terminal connected to the electronic control member.

Further, one of the first MOSFET and the second MOSFET is an NMOSFET and the other is a PMOSFET.

Further, the power supply regulation unit comprises a DC-DC converter and a control unit, where the DC-DC converter comprises an input terminal connected to the positive terminal of the battery and an output terminal connected to the vibration source; and where the control unit is connected between the positive terminal of the battery and the control terminal of the DC-DC converter.

Further, the capacitance of the input terminal of the DC-DC converter is not less than the capacitance of the output terminal.

Further, the capacitance of the input terminal is an integer multiple of the capacitance of the output terminal.

Further, the control unit is an electronic control member, or the control unit comprises a switching member electrically connected to the positive terminal of the battery and an electronic control member electrically connected to the switching member, where the electronic control member is electrically connected to the control terminal of the DC-DC converter.

According to another aspect of the present invention, there is provided a power supply method of the vibration capsule.

In the method, the supply voltage of the battery to the vibration source is regulated by a power supply regulation unit, and the supply voltage is lower than the total voltage of the battery.

Further, the battery comprises:
a first button cell battery connected in series with the vibration source to form a first circuit;
a second button cell battery connected in series to the negative terminal of the first button cell battery, the second button cell battery connected in series with the vibration source to form a second circuit;
the power supply regulation unit comprises:
a switching member electrically connected to the positive terminal of the first button cell battery;
an electronic control member electrically connected to the switching member, comprising a first control terminal and a second control terminal;
a first MOSFET, comprising a control terminal connected to the first control terminal, a current input terminal connected to the positive terminal of the first button cell battery, and a current output terminal connected to the vibration source; and
a second MOSFET, comprising a control terminal connected to the second control terminal, a current input terminal connected to the vibration source, and a current output terminal connected to the negative terminal of the second button cell battery.
the power supply method is: controlling the first MOSFET and the second MOSFET to be on and off in turn through the electronic control member after the switching member is turned on, so as to allow the first button cell battery and the second button cell battery alternately power the vibration source; or the power supply regulation unit comprises a DC-DC converter and a control unit, where the DC-DC converter comprises an input terminal connected to the positive terminal of the battery and an output terminal connected to the vibration source; and where the control unit is connected between the positive terminal of the battery and the control terminal of the DC-DC converter.

the power supply method is: the DC-DC converter converts the total voltage of the battery to the supply voltage under the control of the control unit.

The vibration capsule disclosed herein regulates the supply voltage of the battery to the vibration source through the power supply regulation unit, so that the battery provides a supply voltage lower than the total voltage of the battery to the vibration source, which can reduce power consumption and provide longer vibration time while ensuring the vibration safety of the vibration capsule.

DETAILED DESCRIPTION

Figure 1:
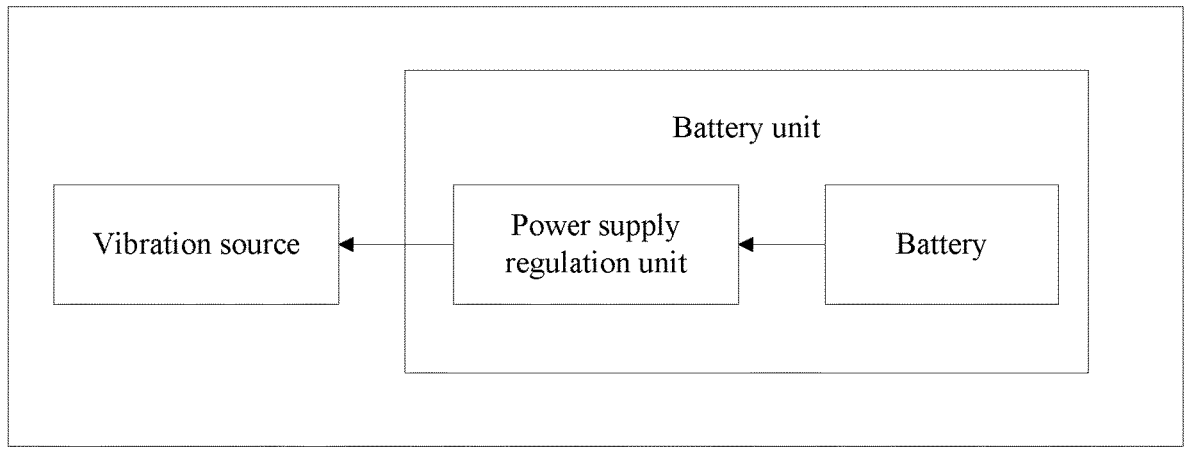
FIG. 1 is a schematic block diagram of a vibration capsule according to a preferred embodiment of the present invention.

The present invention is described in detail below with reference to the accompanying drawings and preferred embodiments. Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

It is appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Referring to FIGS. 1-5, the present invention provides a vibration capsule which comprises an enclosure, and a vibration source and a battery unit disposed within the enclosure. The vibration source and the battery unit are fixed in the enclosure by a fixing structure, and the battery unit is electrically connected to the vibration source to provide power to the vibration source.

The enclosure and its assembling method of the prior art are used, and the vibration source is any kind of vibration motor in the prior art. They are not repeated here.

The battery unit comprises a battery and a power supply regulation unit connected to circuit of battery and the vibration source. The vibration capsule regulates the supply voltage of the battery to the vibration source through the power supply regulation unit, so that the battery provides a power supply voltage lower than the total voltage of the battery to the vibration source, which can reduce power consumption and provide longer vibration time while ensuring the vibration safety of the vibration capsule.

Figure 2:
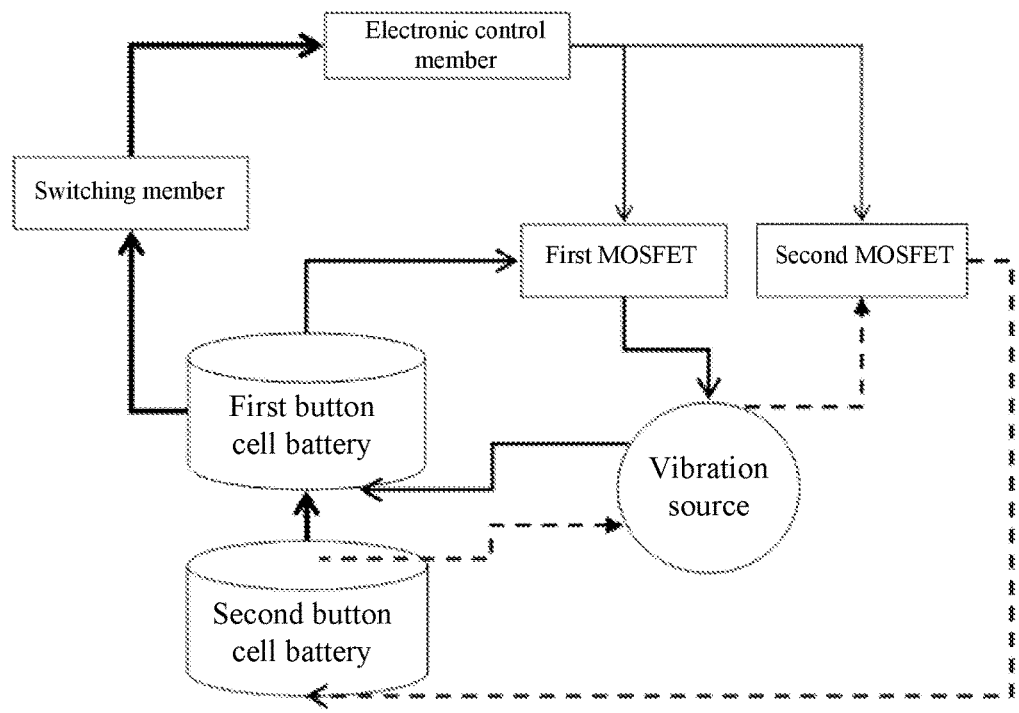
FIG. 2 is a schematic diagram of an electrical connection between a battery unit and a vibration source according to a preferred embodiment of the present invention.

Specifically, referring to the embodiment shown in FIG. 2, the battery comprises a first button cell battery and a second button cell battery connected in series to the negative terminal of the first button cell battery. For example, when the voltages of the two button cell batteries are both 1.5V, a battery with a total voltage of 3V is constituted by connecting the two button cell batteries in series, which solves the problem that existing batteries have limited charging and discharging capacity and battery capacity.

The first button cell battery is connected in series with the vibration source to form a first circuit, and the second button cell battery is connected in series with the vibration source to form a second circuit.

Figure 3:
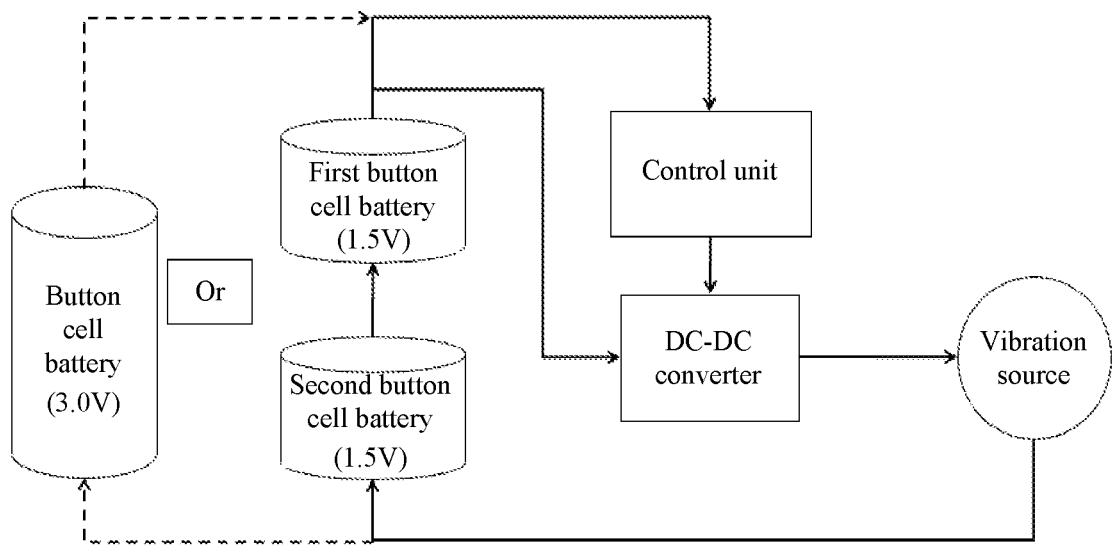
FIG. 3 is a schematic diagram of an electrical connection between the battery unit and the vibration source according to another preferred embodiment of the present invention.
Figure 4:
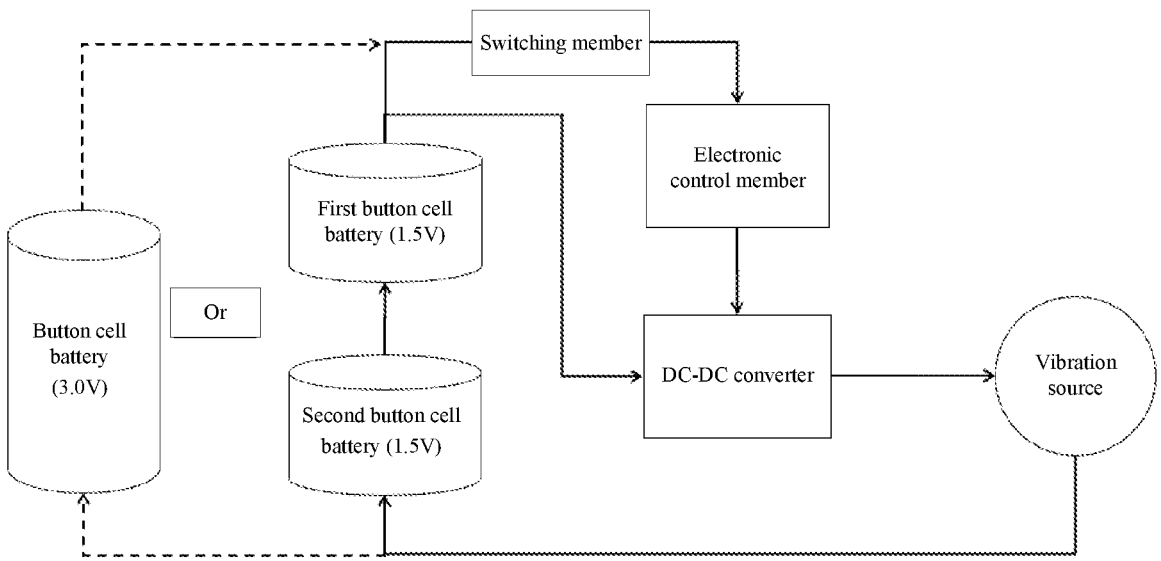
FIG. 4 is a schematic diagram of an electrical connection between the battery unit and the vibration source according to still another preferred embodiment of the present invention.

The power supply regulation unit comprises a switching member, an electronic control member electrically connected to the switching member, and a first MOSFET (Metal-Oxide-Semiconductor Field-Effect Transistor) and a second MOSFET separately connected to the two control terminals of the electronic control member. In one embodiment, the electronic control component, the first MOSFET and the second MOSFET are integrated on a PCB board. Referring to FIG. 3, the vibration source and the battery unit are separately arranged at two ends of the enclosure, and the PCB board is arranged between the vibration source and the battery unit. This arrangement makes the internal structure of the vibration capsule more compact and improves the stability of signal transmission. Preferably, the vibration source, the PCB board and the battery unit are all arranged on a central axis along the length of the vibration capsule, and each device is symmetrical along the central axis. This setting can enhance the stability of the vibration capsule during the movement.

The switching member is electrically connected to the positive terminal of the first button cell battery. When the switching member is turned on, the battery outputs a total voltage to the electronic control member to meet the voltage requirement of the electronic control member.

The electronic control member comprises a first control terminal and a second control terminal. The first MOSFET comprises a control terminal connected to the first control terminal, a current input terminal connected to the positive terminal of the first button cell battery, and a current output terminal connected to the vibration source. The second MOSFET comprises a control terminal connected to the second control terminal, a current input terminal connected to the vibration source, and a current output terminal connected to the negative terminal of the second button cell battery. After the switching member is turned on, the first MOSFET and the second MOSFET are controlled to be on and off in turn through the electronic control member, so as to allow the first button cell battery and the second button cell battery alternately power the vibration source; and it is ensured that the first MOSFET and the second MOSFET is not turned on at the same time, thus protecting the battery and the electronic control member. This method can reduce power consumption and provide longer vibration time while ensuring the vibration safety of the vibration capsule.

Specifically, the switching member comprises a reed switch and a third MOSFET. The third MOSFET comprises a control terminal connected to the reed switch, a current input terminal connected to the positive terminal of the first button cell battery, and a current output terminal connected to the electronic control member. When the reed switch is closed, the third MOSFET is turned on, and the battery supplies power to the electronic control member. When the reed switch is turned off, the third MOSFET is not turned on, and the power supply from the battery to the electronic member is turned off. Through the cooperation of the reed switch and the third MOSFET to turn on and off of the vibration source by the battery unit, it can ensure that the battery unit does not consume power, except for the self loss of the battery unit, before the vibration capsule is activated, thereby prolonging the service life of the battery unit and providing longer vibration time.

In one embodiment, one of the first MOSFET and the second MOSFET is an NMOSFET and the other is a PMOSFET. The MCU (Microcontroller Unit) in the electronic control member outputs PWM (Pulse width modulation) signals at regular intervals and controls the on/off of the first MOSFET and the second MOSFET alternately via high and low levels, so as to control the first button cell battery and the second button cell battery to supply power to the vibration source in turn.

Specifically, when the first MOSFET is turned on, current is input from the positive terminal of the first button cell battery to the first MOSFET and returns to the negative terminal of first button cell battery after passing through the vibration source, so that the first button cell battery drives the vibration source to work. When the second MOSFET is turned on, current is input from the positive terminal of the second button cell battery to the second MOSFET and returns to the negative terminal of second button cell battery after passing through the vibration source, so that the second button cell battery drives the vibration source to work. In this order, the first button cell battery and the second button cell battery take turns to drive the vibration source to work. In addition, the first MOSFET and the second MOSFET cannot be turned on at the same time, otherwise the battery and the electronic control member can be severely damaged.

Referring to another embodiment shown in FIG. 3, the power supply regulation unit comprises a DC-DC converter (Direct current-Direct current converter) and a control unit, where the control unit may be the electronic control member. The DC-DC converter comprises an input terminal connected to the positive terminal of the battery and an output terminal connected to the vibration source. The control unit is connected between the positive terminal of the battery and the control terminal of the DC-DC converter. The control unit outputs switching control signals at regular intervals. With the control of the control unit, the DC-DC converter converts the total voltage of the battery into a supply voltage lower than the total voltage of the battery and can output a different voltage within the allowable voltage range of the vibration source, which can reduce power consumption and provide longer vibration time while ensuring the vibration safety of the vibration capsule; and the circuit and logic are simple and are not affected by the performance of the battery, so the current can be stably output to make the vibration source work in a more stable state.

The battery may be a battery constituted by the first button cell battery and the second button cell battery connected in series, or directly a button cell battery. For example, the battery is a 3V battery constituted by two 1.5V button cell batteries connected in series, or the battery is a 3V battery.

Figure 5:
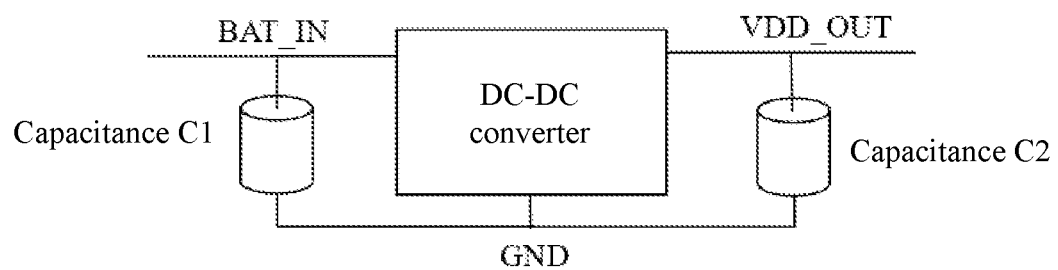
FIG. 5 is a schematic diagram of the DC-DC converter in FIG. 3 or FIG. 4.

Further, the capacitance of the input terminal of the DC-DC converter is not less than the capacitance of the output terminal, so when the DC-DC converter starts up, the battery voltage to the converter is not pulled down in a very short time, which may make the whole system unable to start up properly. Referring to FIG. 5, the capacitance C1 of the input terminal BAT_IN of the DC-DC converter is not less than the capacitance C2 of the output terminal VDD_OUT of the DC-DC converter. Preferably, the capacitance of the input terminal is greater than the capacitance of the output terminal, and the capacitance of the input terminal is an integer multiple of the capacitance of the output terminal. Alternatively, referring to another embodiment shown in FIG. 4, the control unit comprises a switching member electrically connected to the positive terminal of the battery and an electronic control member electrically connected to the switching member, where the electronic control member is electrically connected to the control terminal of the DC-DC converter. The switching member set forth is the same as that in FIG. 2 and is not described here.

The present invention also provides a method of power supply to the vibration capsule. In the method, the supply voltage of the battery to the vibration source is regulated by means of the power supply regulation unit, and the supply voltage is lower than the total voltage of the battery.

Specifically, in the embodiment shown in FIG. 2, the power supply method is: controlling the first MOSFET and the second MOSFET to be on and off in turn through the electronic control member after the switching member is turned on, so as to allow the first button cell battery and the second button cell battery alternately power the vibration source.

In the embodiment shown in FIG. 3, the power supply method is: the DC-DC converter converts the total battery voltage to the supply voltage under the control of the control unit.

In summary, the vibration capsule regulates the supply voltage of the battery to the vibration source through a power supply regulation unit, so that the battery provides a power supply voltage lower than the total voltage of the battery to the vibration source, which can reduce power consumption and provide longer vibration time while ensuring the vibration safety of the vibration capsule.

It should be appreciated that even though numerous characteristics and advantages of preferred and exemplary embodiments have been set out in the foregoing description, together with details of the structures and functions of the embodiments, the disclosure is illustrative only; and that changes may be made in detail within the principles of the present disclosure to the full extent indicated by the broadest general meaning of the terms in which the appended claims are expressed.

The present invention by no means is limited to the preferred embodiments described above. On the contrary, many modifications and variations are possible within the scope of the appended claims.

What is claimed is:

1. A vibration capsule, comprising:
   an enclosure;
   a vibration source disposed within the enclosure;
   a battery unit electrically connected to the vibration source, wherein the battery unit comprises a battery and a power supply regulation unit connected to the circuit of the battery and the vibration source:
wherein the battery comprises:
a first button cell battery connected in series with the vibration source to form a first circuit;
a second button cell battery connected in series to the negative terminal of the first button cell battery, the second button cell battery connected in series with the vibration source to form a second circuit; and
wherein the power supply regulation unit comprises:
a switching member electrically connected to the positive terminal of the first button cell battery;
an electronic control member electrically connected to the switching member, comprising a first control terminal and a second control terminal;
a first MOSFET, comprising a control terminal connected to the first control terminal, a current input terminal connected to the positive terminal of the first button cell battery, and a current output terminal connected to the vibration source; and
a second MOSFET, comprising a control terminal connected to the second control terminal, a current input terminal connected to the vibration source, and a current output terminal connected to the negative terminal of the second button cell battery.

2. The vibration capsule of claim 1, wherein the switching member comprises a reed switch and a third MOSFET, wherein the third MOSFET comprises a control terminal connected to the reed switch, a current input terminal connected to the positive terminal of the first button cell battery, and a current output terminal connected to the electronic control member.

3. The vibration capsule of claim 1, wherein one of the first MOSFET and the second MOSFET is an NMOSFET and the other is a PMOSFET.

4. A power supply method of vibration capsule according to claim 1, wherein the supply voltage of a battery to a vibration source is regulated by a power supply regulation unit, and the supply voltage is lower than the total voltage of the battery;
wherein the battery comprises:
the first button cell battery connected in series with the vibration source to form a first circuit;
the second button cell battery connected in series to the negative terminal of the first button cell battery, the second button cell battery connected in series with the vibration source to form a second circuit; and wherein
the power supply regulation unit comprises:
the switching member electrically connected to the positive terminal of the first button cell battery;
the electronic control member electrically connected to the switching member, comprising a first control terminal and a second control terminal;
the first MOSFET, comprising a control terminal connected to the first control terminal, a current input terminal connected to the positive terminal of the first button cell battery, and a current output terminal connected to the vibration source; and
the second MOSFET, comprising a control terminal connected to the second control terminal, a current input terminal connected to the vibration source, and a current output terminal connected to the negative terminal of the second button cell battery;
the power supply method is: controlling the first MOSFET and the second MOSFET to be on and off in turn through the electronic control member after the switching member is turned on, so as to allow the first button cell battery and the second button cell battery alternately power the vibration source.

5. The power supply method of claim 4, wherein the first MOSFET and the second MOSFET are controlled to be on and off in turn through the electronic control member after the switching member is turned on, so as to allow the first button cell battery and the second button cell battery alternately power the vibration source.

6. The power supply method of claim 5, wherein when the first MOSFET is turned on, current is input from the positive terminal of the first button cell battery to the first MOSFET and returns to the negative terminal of first button cell battery after passing through the vibration source, so that the first button cell battery drives the vibration source to work; when the second MOSFET is turned on, current is input from the positive terminal of the second button cell battery to the second MOSFET and returns to the negative terminal of second button cell battery after passing through the vibration source, so that the second button cell battery drives the vibration source to work.

7. The power supply method of claim 5, wherein the switching member comprises a reed switch and a third MOSFET, the third MOSFET comprises a control terminal connected to the reed switch, a current input terminal connected to the positive terminal of the first button cell battery, and a current output terminal connected to the electronic control member;
when the reed switch is closed, the third MOSFET is turned on, and the battery supplies power to the electronic control member;
when the reed switch is turned off, the third MOSFET is not turned on, and the power supply from the battery to the electronic member is turned off.

8. A vibration capsule, comprising:
an enclosure;
a vibration source disposed within the enclosure;
a battery unit electrically connected to the vibration source, wherein the battery unit comprises a battery and a power supply regulation unit connected to the circuit of the battery and the vibration source; wherein the power supply regulation unit comprises a DC-DC converter and a control unit, wherein the DC-DC converter comprises an input terminal connected to the positive terminal of the battery and an output terminal connected to the vibration source; and wherein the control unit is connected between the positive terminal of the battery and the control terminal of the DC-DC converter.

9. The vibration capsule of claim 8, wherein the capacitance of the input terminal of the DC-DC converter is not less than the capacitance of the output terminal.

10. The vibration capsule of claim 9, wherein the capacitance of the input terminal is an integer multiple of the capacitance of the output terminal.

11. The vibration capsule of claim 8, wherein the control unit is an electronic control member, or the control unit comprises a switching member electrically connected to the positive terminal of the battery and an electronic control member electrically connected to the switching member, wherein the electronic control member is electrically connected to the control terminal of the DC-DC converter.

12. A power supply method of vibration capsule according to claim 8, wherein the supply voltage of a battery to the vibration source is regulated by the power supply regulation unit, and the supply voltage is lower than the total voltage of the battery;

wherein the power supply regulation unit comprises the DC-DC converter and the control unit, the DC-DC converter comprises the input terminal connected to the positive terminal of the battery and the output terminal connected to the vibration source; and the control unit is connected between the positive terminal of the battery and the control terminal of the DC-DC converter;

the power supply method is: the DC-DC converter converts the total voltage of the battery to the supply voltage under the control of the control unit;

wherein the capacitance of the input terminal of the DC-DC converter is not less than the capacitance of the output terminal.

13. The power supply method of claim 12, wherein the capacitance of the input terminal is an integer multiple of the capacitance of the output terminal.

14. The power supply method of claim 12, wherein the DC-DC converter converts the total voltage of the battery into a supply voltage lower than the total voltage of the battery and output a different voltage within the allowable voltage range of the vibration source through the control of the control unit.

\* \* \* \* \*